Aug. 4, 1959

P. L. MAY 2,897,747

WIRE TWISTER FOR BALERS

Filed Nov. 2, 1956

INVENTOR.
Patrick L. May
BY
Paul O. Pippel
Atty.

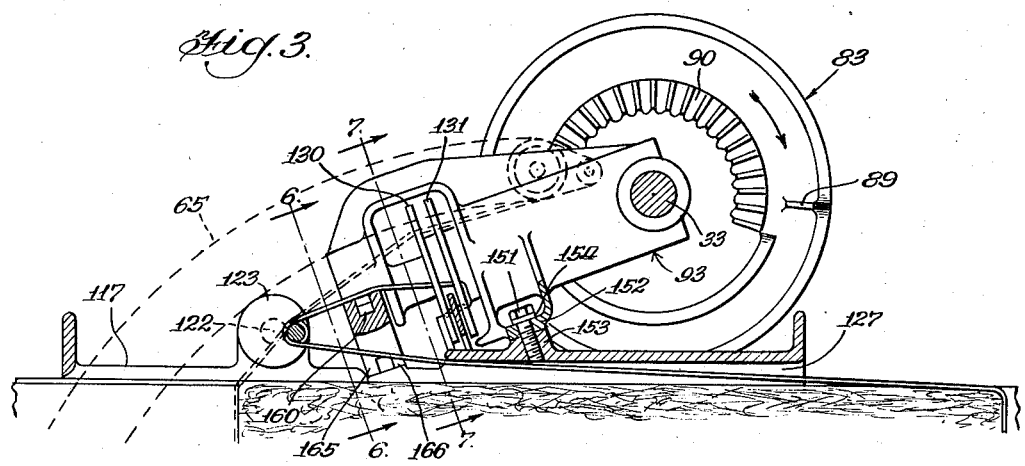
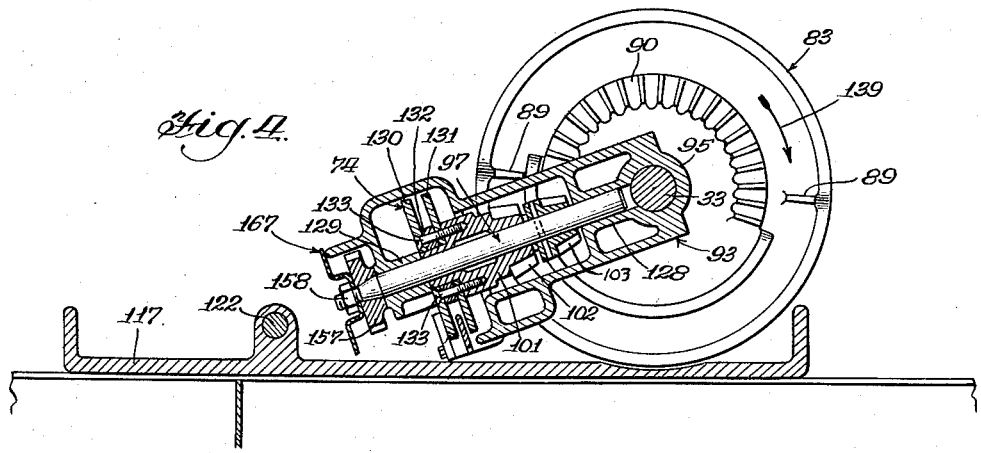
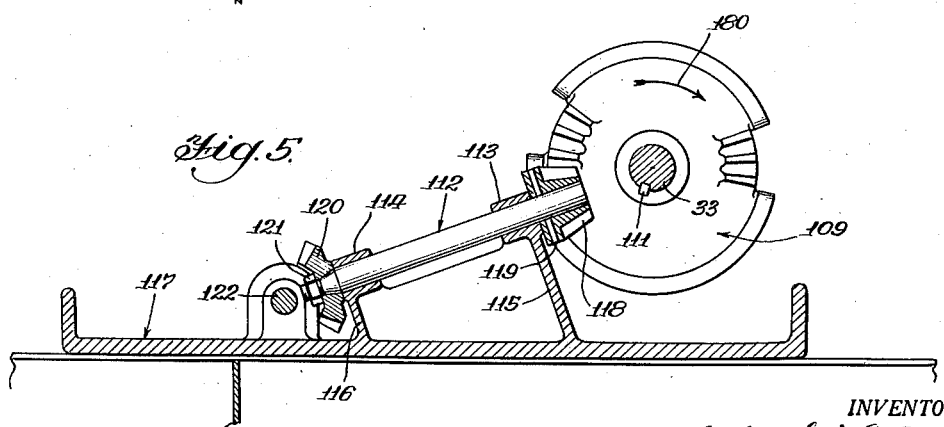

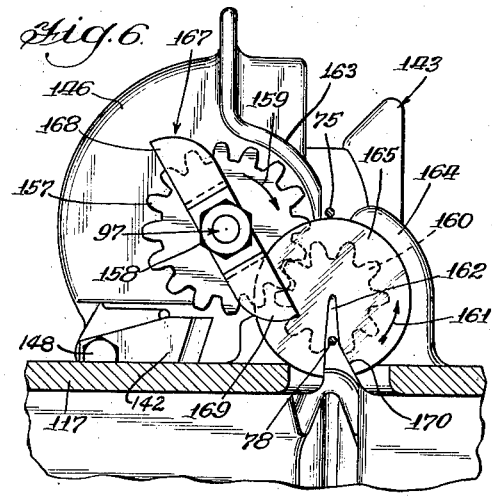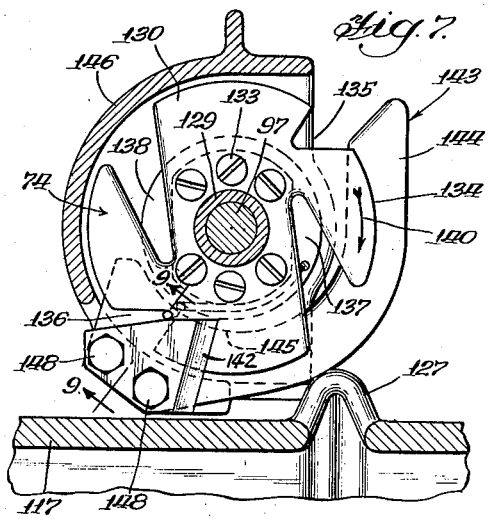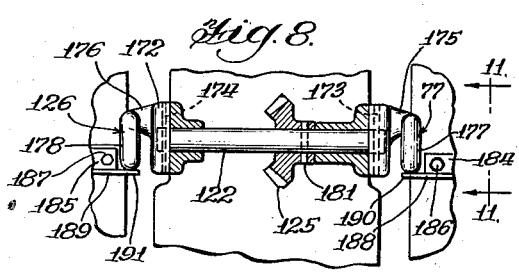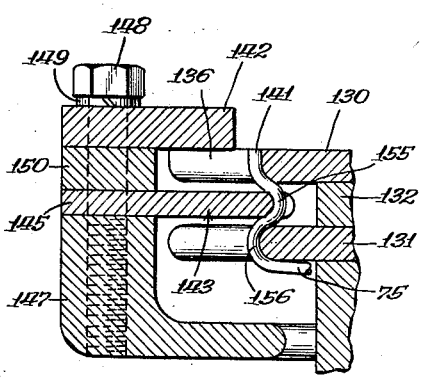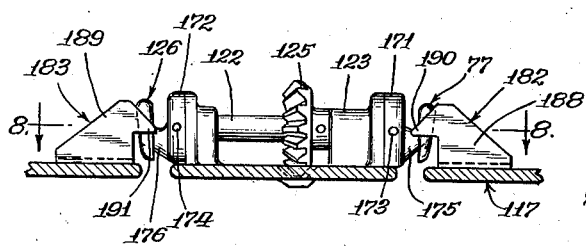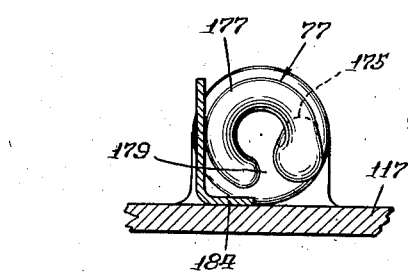

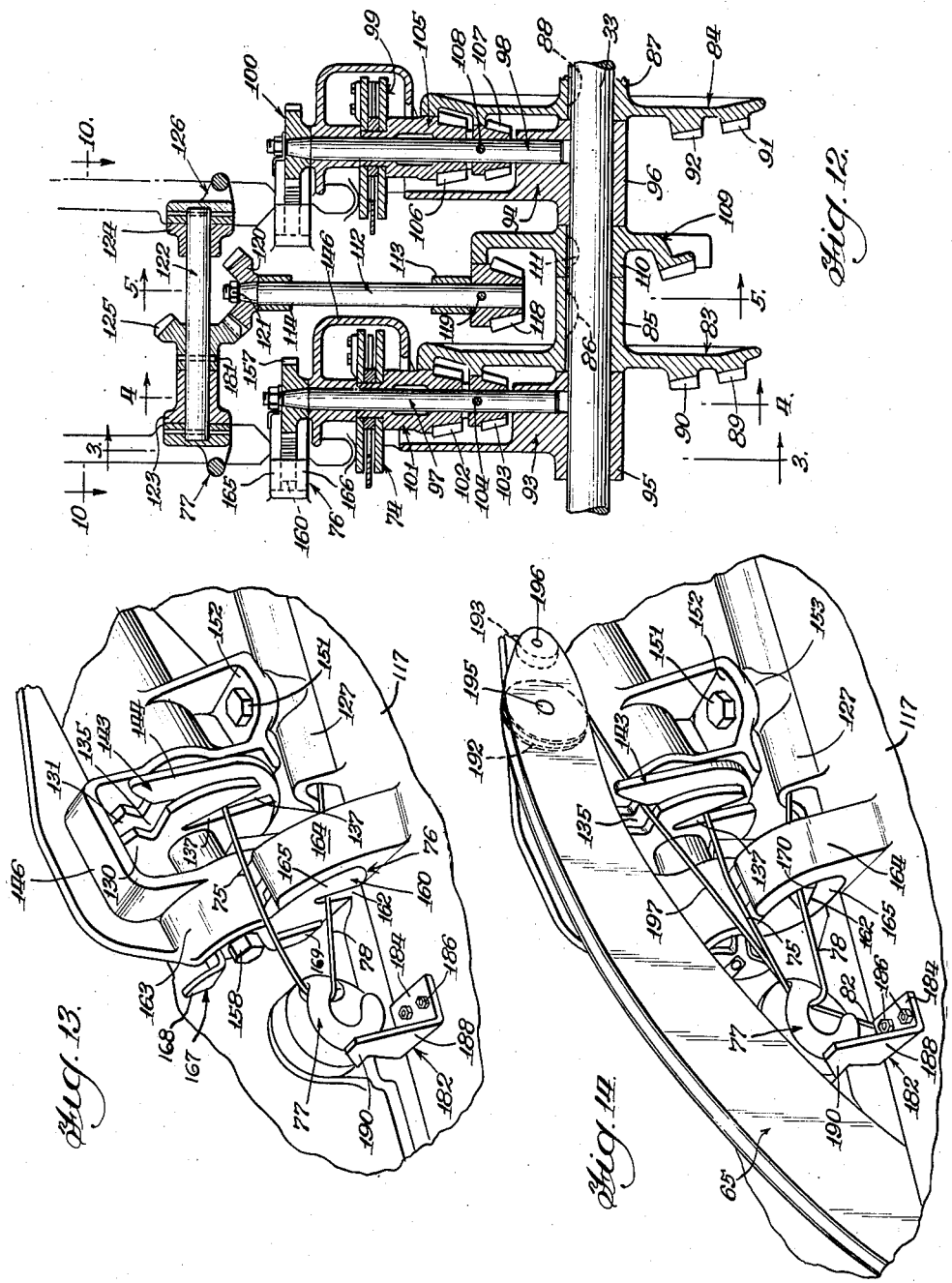

Aug. 4, 1959
P. L. MAY
2,897,747
WIRE TWISTER FOR BALERS
Filed Nov. 2, 1956
5 Sheets-Sheet 5
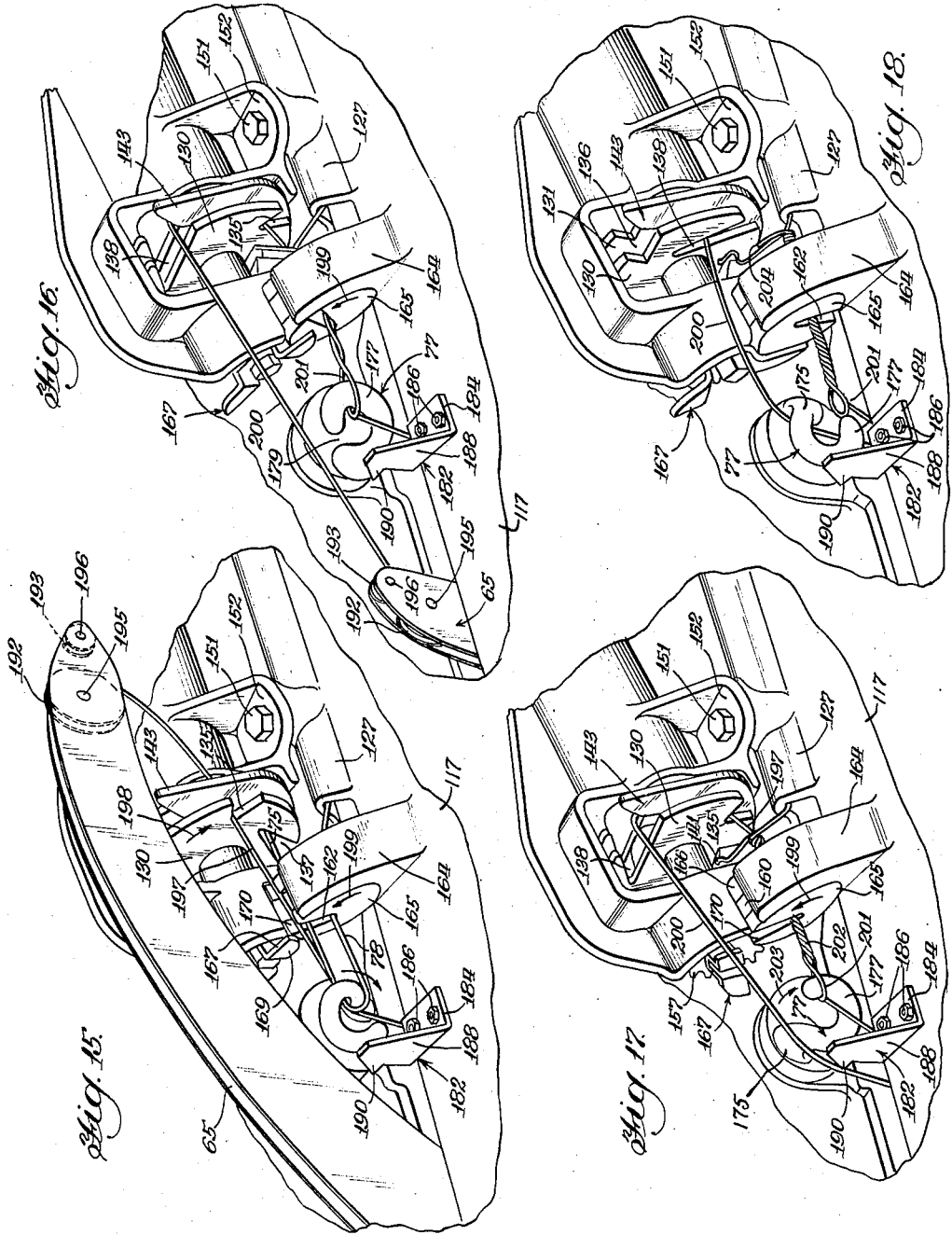
INVENTOR.
Patrick L. May
BY
Paul O. Pippel
Atty.

United States Patent Office 2,897,747
Patented Aug. 4, 1959

2,897,747

WIRE TWISTER FOR BALERS

Patrick L. May, Memphis, Tenn., assignor to International Harvester Company, a corporation of New Jersey Application November 2, 1956, Serial No. 620,003

10 Claims. (Cl. 100—4)

This invention relates to a new and improved wire twister for hay balers.

The farm implement industry has produced many hay balers with various types of wire twisting devices. Also, throughout the years many, many patents have been granted on wire twisters for hay balers. The ultimate, of course, in a wire twisting mechanism is to produce a strong neat twist with a simple mechanism and one which will not produce and/or drop any short pieces of wire which might cause damage to livestock.

It is thus a principal object of this invention to provide a wire twisting mechanism for hay balers which is relatively simple in design and yet produces a strong effective wire twist to a bale-surrounding wire strand.

An important object of this invention is the provision of means in a wire twister for hay balers wherein a three wire inline twist may be imparted to a wire strand surrounding a formed bale without halting either the wire carrying needle operation or the bale compressing plunger operation.

Another important object of this invention is to equip a wire twisting hay baler with means for producing a three wire inline twist having a loop at one end of the twist and providing this loop in the twist without stopping any of the baler operations.

Still another important object of this invention is to supply a slotted gear wire twister for balers having a combination wire holding and cutting means on one side of the slotted gear and a hook element on the other side of the slotted gear and so arranged and constructed as to permit intertwisting of one looped end of a bale-surrounding wire strand with the other end of the bale-surrounding wire strand without interference with a succeeding wire strand laid in position and held by the holding member on one side and by the hook on the other side spaced upwardly from the slotted gear.

Still another important object of this invention is to provide a relatively simple and economical inline wire twister.

Another and still further important object of this invention is the provision of means for positively inserting wire strand ends in the bottom of the slot of a slotted gear whereupon the inline twist formed in the wires by the slotted gear uniformly twists all component wires of the intertwist.

Other and further important objects and advantages will become apparent from the disclosures in the following specification and accompanying drawings.

In the drawings:

Figure 3 is a sectional view of a portion of the wire twisting mechanism of this invention and is more particularly located and taken on the line 3—3 of Figure 12.

Figure 4 is a sectional view taken on the line 4—4 of Figure 12.

Figure 5 is a sectional view taken on the line 5—5 of Figure 12.

Figure 6 is a sectional view taken on the line 6—6 of Figure 3 in slightly larger scale.

Figure 7 is a sectional view taken on the line 7—7 of Figure 3 and also enlarged.

Figure 8 is a sectional view taken on the line 8—8 of Figure 10.

Figure 9 is an enlarged sectional view taken on the line 9—9 of Figure 7.

Figure 10 is a sectional view taken on the line 10—10 of Figure 12.

Figure 11 is a sectional view taken on the line 11—11 of Figure 8.

Figure 12 is a sectional view taken on the line 12—12 of Figure 2.

Figure 13 is a perspective view of a portion of the wire twisting mechanism of this invention shown at the commencement of the cycle of operations.

Figure 14 is another view similar to Figure 13 with the strand carrying needle shown laying a new strand therein.

Figure 15 is another view of the device as shown in Figures 13 and 14 and further showing the relative movement of parts during the wire twisting operation.

Figure 16 is still another successive perspective view of a portion of the wire twister at a time when the strand carrying needle is being retracted and the wire twist is being formed in the ends of a strand of wire surrounding a formed bale.

Figure 17 is the next succeeding view as shown in Figures 13, 14, 15 and 16 of the wire twisting mechanism wherein the twist is substantially completed and is about to be released from the holding and hook mechanisms.

Figure 18 shows still another successive step in the operation of the wire twister wherein the inline wire twist is being discharged from the twisting mechanism and the new wire to surround the succeeding bale is dropped into the hook mechanism and gripped by the wire holding means.

Figure 1:
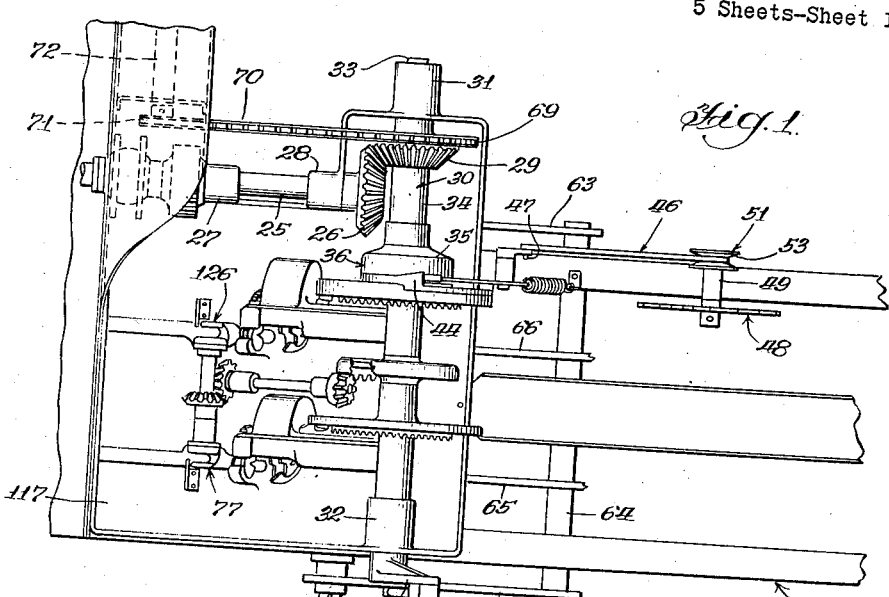
Figure 1 is a top plan view of a portion of a hay baler incorporating the wire twist mechanism of this invention.

As shown in the drawings, the reference numeral 10 indicates generally a bale-forming chamber on which the wire twister of this invention is mounted. The bale-forming chamber 10 is carried on supporting wheels 11 and by means of a reciprocating plunger therein acts to form compressed bales of hay. The baler of this invention is of the type shown in the Crumb et al. Patent 2,450,082. The baler includes a hay receiving platform 13 having a back wall 14 and a laterally and upwardly inclined wall member 15 adjacent the bale-forming chamber 10 for the purpose of guiding and condensing hay delivered from the platform to the bale-forming chamber. Oscillating packer fingers 16 are adapted to swing and sweep across the platform 13 and through slots 17 and 18 in the inclined guiding wall 15 and across the top of the bale-forming chamber 10 so that material such as hay is positively carried from the platform 13 to the bale-forming chamber 10 whereupon the reciprocating plunger 12 may act to compress the hay to form relatively compact bales. The bales, of course, are subsequently tied in individual units so that they may be conveniently stored until use is desired.

A split crank shaft 19 receives drive from a suitable source of power such as an engine or a tractor power take-off, neither of which are shown in these drawings. The crank shaft has a crank arm 20 carrying a crank pin at its outer end for receiving the packer fingers 16. Thus as the split shaft 19 is rotated, the packer fingers 16 gyrate to sweep the platform 13 clean of hay and deliver it into the bale-forming chamber 10 whereupon the reciprocating plunger 12 causes it to be compressed. As best shown in Figure 2, the shaft 19 is journaled in suitable bearing members 22 on the back wall 14 of the baler platform. At the rearward end of the shaft 19 there is mounted thereon a spur gear 23 which is in meshing engagement with a second spur gear 24 located therebeneath. The spur gear 24 is mounted on and drives a shaft 25 which projects rearwardly, as shown in both of Figures 1 and 2 where it terminates with a bevel gear 26 thereon. The shaft 25 is generally supported in spaced bearings 27 and 28 on the frame structure of this hay baler. It should be understood that the frame structure includes all of the superstructure, namely the bale-forming chamber, the platform, the platform back wall and the angularly inclined wall member 15. The bevel gear 26 meshes with another bevel gear 29 which is disposed at right angles thereto. The bevel gear 29 is mounted on a shaft structure 30 which projects across the top of the bale-forming chamber 10 and imparts rotational drive to the wire twisting mechanism of this invention. The shaft 30 is journally mounted within spaced bearings 31 and 32 on opposite sides of the bale-forming chamber.

The shaft structure 30 includes a centrally disposed shaft member 33 and a sleeve 34 journalled freely thereon. The bevel gear 29 is fastened to the sleeve 34 as is the bell portion 35 of a clutch member 36. The clutch 36 is similar in operation and structure to a corresponding clutch shown in the patent to Bornzin 2,634,840. The bevel gear 29 and thus also the bell housing 35 of the clutch 36 rotate constantly as long as the hay baler is operating. It is the function of the clutch 36 and an operating means therefor to intermittently cause a driving of the internal shaft 33 on which is mounted the wire twisting mechanism, as will be subsequently described. Although the clutch 36 is not primarily involved in the present invention, it is believed necessary to show some means of effecting a tripping thereof to cause actuation of the twister mechanisms. A clutch trip arm 37 is pivotally mounted at 38 on the supporting structure of this hay baler. A spring 39 is fastened at 40 to an offset arm 41 of the trip arm 37. The other end of the spring is fastened at 42 to the supporting structure of the hay baler, thus normally urging the trip arm 37 toward a clockwise rotation and thus a releasing of the trip arm and an actuation of the clutch 36 to effect drive of the internal shaft 33. The upper edge 43 of the trip arm 37 is adapted to engage a notch in the clutch 36 to prevent the driven part 44 thereof from being rotated with the bell housing portion 35. As best shown in Figure 2, an offset downward extension 45 has an actuating arm 46 pivoted thereto at 47. The actuating link 46 as shown in Figure 2 prevents rotation of the trip finger 37 and thus the clutch 36 cannot impart rotational drive from the driving bell housing 35 to the driven cooperative member 44. The connecting or actuating link 46 must be permitted to move forwardly in order for the trip lever 37 to rock about its pivot 38 before the wire twisting occurs. A bale length metering wheel 48 is journally mounted on a shaft 49 carried by the supporting structure of this hay baler. The metering wheel has a sawtooth outer periphery 50 which is arranged and constructed to penetrate the top surface of the formed bales as they move rearwardly through the bale chamber 10. A V-pulley 51 is mounted on the shaft 49 and rotates along with the metering wheel 48. The connecting or actuating arm 46 has a bent end 52 which is disposed generally vertically and is adapted to ride in the V-notch 53 in the V-pulley 51. The metering wheel 48 rotates in the direction indicated by the arrow 54, whereupon the V-pulley 51 rotates to effect a raising of the bent end 52 of the actuating link 46 until such a time as the end of the bent portion reaches the top of the V-pulley 51 thereupon permitting the spring 39 to pull the trip arm 37 out of engagement with the ledge on the cooperative clutch element 44. This, of course, commences a driving through the clutch 36 to the shaft 33 and thus, also, to the wire twisting mechanisms. It will be apparent that as the metering wheel rotates a distance sufficient to effect a raising of the bent end portion 52 of the actuating link the operation of the wire twisters will occur. There is thus a relationship between the length of the bales and the time the wire twisters come into operation.

A crank arm 55 is keyed as shown at 56 to the outer end of the shaft 33 opposite the bevel gear 29. An adjustable length connecting link 57 is pivotally attached at the outer end of the crank arm 55 at 58. The other end 59 of the link 57 is pivotally attached to a second crank arm 60 which as best shown in Figure 2 is pivoted at 61 on the side of the bale-forming chamber 10. Outwardly projecting arms 62 and 63 are located at opposite ends of the hinge shaft 61 for the purpose of carrying a rod 64 at their outer ends which in turn supports spaced wire carrying needles 65 and 66. The strand carrying needles 65 and 66 are thus adapted to move upwardly through the bale-forming chamber 10 to the dashline position as shown at 67 in Figure 2 whenever the trip mechanism actuates the shaft 33 into rotation. The crank arm 55 of course makes a full revolution in the direction of the arrow 68, thus causing the link arm 57 to move the crank 60 and the needles 65 and 66 upwardly through the bale-forming chamber and over across the wire twisting mechanisms to be subsequently described.

Figure 2:
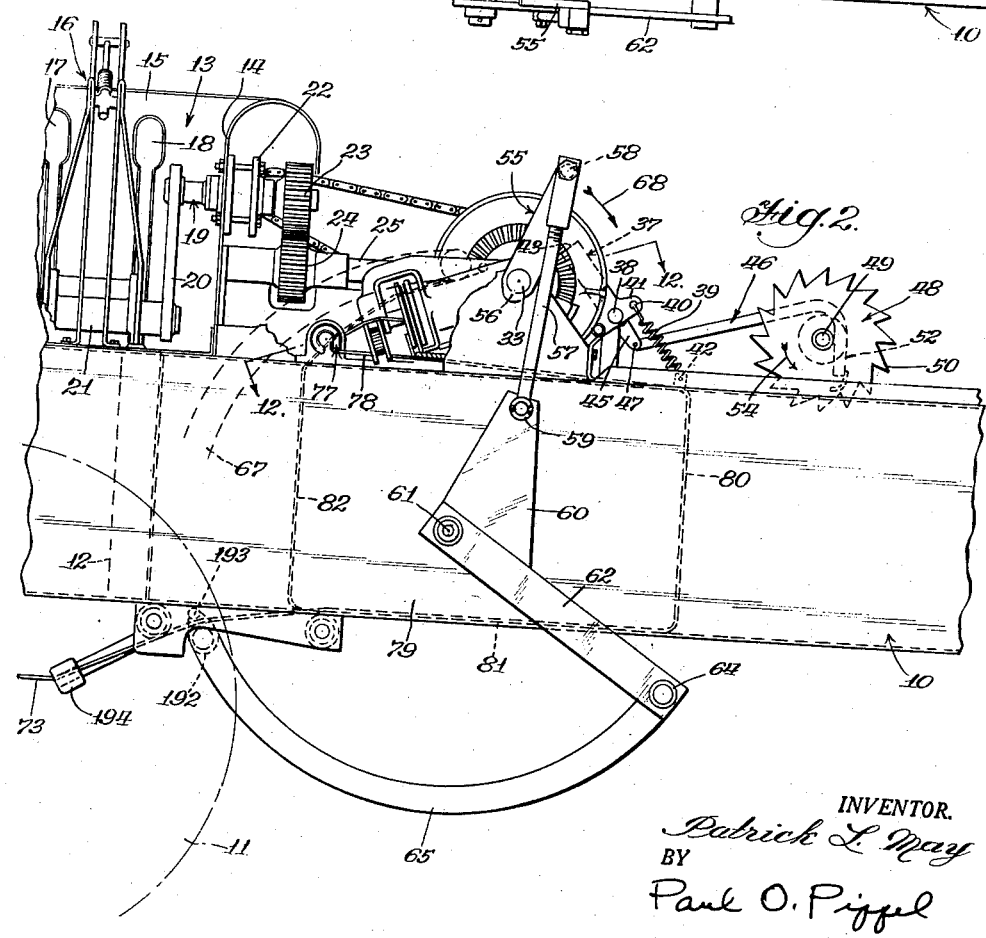
Figure 2 is a side elevational view of a portion of the baler as shown in Figure 1.

As shown in Figure 1, a sprocket 69 is mounted on and fastened to the bevel gear 29 for the purpose of imparting rotational drive through a chain 70 forwardly to a sprocket 71. A shaft 72 carries the sprocket 71 and thus other elements of the hay baler to be driven receive their continuous drive from the source of power through this train of elements.

A source of wire supply provides a wire strand 73 as shown in Figure 2 which is picked up by the needle 65 and carried upwardly in a looped manner with the needle to the wire twisting mechanism. The inner wire strand of the loop is initially held in a holder designated generally by the numeral 74 as shown in Figure 12. The wire strand 75 held in the holder 74 passes forwardly over the twister elements 76 and around a spiral hook member 77 and thence rearwardly as identified by the numeral 78. Returning now to Figure 2, the strand portion 78 constitutes that portion of the strand covering the top of the formed bale, for convenience designated numeral 79. The downwardly turned portion of this strand 80 covers the rearward end of the formed bale 79 and the forwardly turned portion 81 covers the bottom of the bale 79. From this point the wire strand passes into and becomes a part of the source of wire supply as indicated by the strand 73 fed thereto. When the needles 65 and 66 carry their respective strands upwardly to the wire twisters and holding mechanism, the forward end of the bale 79 is covered by a strand portion identified as numeral 82.

As best shown in Figure 12, the shaft 33 which is rotated when the clutch 36 is "in engagement" carries spaced apart enlarged ring members 83 and 84. The ring member 83 has a sleeve-like hub 85 which is keyed as shown at 86 to the shaft 33. Similarly the ring member 84 has a sleeve-like hub 87 which is keyed as shown at 88 to the shaft 33. The ring 83 has outer and inner intermittent or mutilated bevel gears 89 and 90. Similarly the ring 84 has outer and inner intermittent or mutilated bevel gears 91 and 92. Spaced apart housing members 93 and 94 are associated with the supporting structure of the hay baler and thus remain stationary with respect thereto. The housings 93 and 94 are journally mounted over the shaft 33 by sleeve-like bearing portions 95 and 96, respectively. The housing 93 journally carries a shaft 97 at right angles to the shaft 33 which projects downwardly and forwardly of the hay baler and which has mounted therearound the strand holding mechanism 74 and the wire strand twisting mechanism 76 previously briefly discussed. Similarly the housing 94 carries a shaft 98 perpendicular to the shaft 33 and similar to and parallel to the shaft 97. A wire strand holding mechanism 99 and a wire twisting mechanism 100 which correspond and form pairs with the holding mechanism 74 and twister mechanism 76 are mounted on the shaft 98. The purpose of having everything in pairs in this wire twisting hay baler is to provide for the encircling of the formed bale with spaced apart wire strands and intertwisting the ends of both of the encircling strands. A sleeve 101 is journalled on the shaft 97 and has fastened at its forward end the wire strand holding mechanism 74. The rearward end of the sleeve 101 has a bevel gear 102 affixed thereto for engagement with the intermittent or mutilated bevel gear 89 of the ring member 83. Thus as the shaft 33 rotates and imparts rotation to the ring 83 there is similar rotation delivered through the mutilated bevel gear 89 to the bevel gear 102 and thence to the sleeve 101 and its associated wire holding mechanism 74. A bevel gear 103 is pinned as shown at 104 to the shaft 97. This bevel gear 103 meshes with the inner mutilated bevel gear 90 of the ring element 83 thus imparting rotation to the shaft 97. The forward end of the shaft 97 has the wire twisting mechanism 76 affixed thereto thus receiving the rotation necessary to effect the twisting of the wire strands by reason of the rotation of the shaft 33. Correspondingly the shaft 98 has a sleeve 105 mounted thereon and it carries at its forward end the wire holding mechanism 99 and a bevel gear 106 at its other end. Rotation of the ring element 84 delivers intermittent rotation to the sleeve 105 by the engagement of the outer mutilated bevel gear engaging the bevel gear 106. Thus rotation of the wire holding mechanism 99 is accomplished. This of course is similar in design and function to the sleeve 101 on the shaft 97. A bevel gear 107 is pinned at 108 to the shaft 98 and is in meshing engagement with the inner mutilated bevel gear 92 of the element 84. The wire twisting mechanism 100 is fastened to and rotates with the lower forward end of the shaft 98.

A mutilated ring gear 109 having a hub 110 is keyed as shown at 111 to the driving shaft 33. The ring member 109 is disposed between the housing members 93 and 94 and their respective shafts 97 and 98. A shaft 112 is inclined downwardly and forwardly and is between the shafts 97 and 98 and substantially parallel therewith. The shaft is mounted in spaced apart supporting bearings 113 and 114 which, as shown in Figure 5, are supported by upstanding arms 115 and 116, respectively, from the top stationary portion 117 of the bale-forming chamber 10. The portion 117 is in the form of a supporting plate which is mounted on and rests on the top of the bale-forming chamber. All of the wire twisting mechanism is carried on this plate 117. A bevel gear 118 is pinned, as shown at 119, to the shaft 112. The bevel gear 118 meshes with the mutilated bevel gear 109 and receives intermittent drive therefrom to impart rotation to the downwardly and forwardly inclined shaft 112. The lower forward end of the shaft 112 has a bevel gear 120 mounted thereon and is held in fixed position by the nut 121 threadedly engaging the lower end of the shaft. A cross shaft 122 is journally mounted in spaced bearings 123 and 124 which are in the nature of pillow blocks. The pillow block bearings 123 and 124 are carried directly on the plate member 117. The shaft 122 has mounted thereon a bevel gear 125 which is in meshing relationship with the bevel gear 120. Thus as the shaft 112 is rotated so also is the shaft 122. The outer ends of the shaft 122 have mounted thereon the spiral hook member 77 at one end and a similar corresponding spiral hook member 126 at the other end. Thus all of the elements driven from the shaft 33 have been generally described and each of these elements will be further defined in detail to indicate their respective function in the wire twisting device of this invention.

As best shown in Figure 13, the wire strand end 75 is held in the holder mechanism 74 whereupon it passes forwardly over the top of the twister mechanism 76 and thence through the spiral hook 77 and, as shown at 78, through the twisting mechanism 76 and thence rearwardly over the top of the newly formed and compressed bale through a raised tunnel-shaped member 127 in the supporting plate member 117. As described previously, the strand 78 passes rearwardly around the bale being formed and thence downwardly and under the bale whereupon the needle 65 carries the end of the strand upwardly in looped fashion with the lower or inner portion thereof being placed into the wire twisting mechanism as shown in Figure 14.

As best shown in Figure 4, the shaft 97 is supported in spaced apart bearings 128 and 129 formed in the housing part 93 which, as previously stated, is journally carried by the bushing 95 on the driving shaft 33. The wire holder 74 includes a pair of disc members 130 and 131 having an intermediately disposed spacer member 132. The two discs 130 and 131 and the included spacer 132 are held fixedly by means of bolts 133 to the sleeve 101. The shape of the discs 130 and 131 are best indicated in Figure 7 wherein the bottom plate 130 is shown in elevational detail. The outer periphery 134 of the plate disc 130 is equipped with two diametrically opposed relatively shallow notches 135 and 136. Intermediate these two notches are another pair of substantially diametrically opposed notches which extend radially deeper, as shown at 137 and 138. The notches in the spaced plates 130 and 131 are identical one to the other and hence the showing of plate 130 in Figure 7 is sufficient to indicate the positioning of the notches in its paired plate 131. It is pointed out that the deep notches 137 and 138 are not directly radial, but rather are angularly disposed to enable deeper notches with a lesser diametered disc. It should thus be understood that when the shaft 33 is rotated and the bevel gear portion 89 acts to engage the bevel gear 102, the pair of discs constituting the wire holder will be rotated. The degree of rotation is relatively small and, as shown in Figure 4, amounts to only one gear tooth of movement for every half revolution of the ring gear element 83. The direction of rotation of the ring 83 is indicated by the arrow 139 in Figure 4 which results in a rotation of the pair of discs 130 and 131 in the direction of the arrow 140 as shown in Figure 7.

The end of the wire strand of that portion 75 is shown at 141 in Figure 9 beneath the disc 130 and closely adjacent a wire cutoff knife 142. A wire guiding or confining arm 143 has a vertical portion 144 on the side of the wire holder over which the wire carrying needle 65 passes. The lower end of the substantially vertical portion 144 curves downwardly and inwardly of the discs 130 and 131 and substantially between these discs. The primary feature of the wire guiding or confining member 143 is to guide strands of wire radially inwardly as it moves downwardly of the arrow to thus more or less increase the confinement or restriction of the wire as the holder 74 rotates. The bottom portion of the arm 143 is shown at 145. A shroud or covering 146 forms a continuation of the housing-like member 93 and terminates at the lower end of the wire holder 74 in the form of a boss-like element 147. Bolt members 148 are adapted to have lockwashers 149 and pass through the knife member 142 through a spacer member 150 and thence through the portion 145 of the arm 143 and into the boss member 147 for holding these elements in fixed relationship with respect to the housing portion 93. Thus the knife 142 and the wire confining or guiding arm 143 are held stationary while the disc members 130 and 131 rotate relative thereto. As best shown in Figure 3, a bolt member 151 is arranged and constructed to pass through a flanged portion 152 of the housing portion 93 and thence into a boss 153 for threaded engagement therewith. The boss 153 is located on the tunnel portion 127 of the supporting plate 117. A split lockwasher 154 is interposed between the bolt head and the flange 152 in order to maintain the bolt 151 in locked position relative to the supporting plate 117. Thus the housing portion 93 and also the wire guide and retainer arm 143 and the knife 142 for cutting off the strand remain stationary while the intermediately disposed shaft 97 and the discs 130 and 131 of the wire holder 74 may be rotated.

Returning now to Figure 9, it is evident that the wire end 75 is pinched between the spaced discs 130 and 131 by the retaining arm 143. The end 141 of the wire strand curves inwardly as shown at 155 and thence back downwardly or outwardly as shown at 156 directly beneath the disc 131. It is this crimping of the wire which causes it to be retained in the wire holder 74 during the formation of a succeeding bale of hay, or the like, until such time as the strand carrying needle 65 carries up the other end of the bale surrounding strand for effecting an intertwisting of the ends thereof. From the crimped position of the end of the wire 75 it passes back around from the shallow notch 136 and up to the relatively deep notch 137 at which point it moves forwardly, as shown in Figure 13, and around the spiral hook 77.

The wire twisting mechanism 76 is of the slotted gear type making an inline wire twist. The shaft 97, as best shown in Figures 4 and 6, has a spur gear 157 bolted by means of the nut 158 to the lower forward end thereof. Rotation of the shaft 97 thus causes concurrent rotation of the spur gear 157 in the direction of the arrow 159. The gear 157 is in meshing relationship with a slotted spur gear 160 which by reason of its engagement with the gear 157 rotates in a counterclockwise direction as indicated by the arrow 161. The spur gear 160 has a radially inwardly extending slot 162 open to the periphery thereof to permit strands of wire to be placed therein and be moved to substantially the center of the spur gear whereby upon rotation thereof an inline wire twist is accomplished. A downward and inward continuation of the enlarged portion 146 of the housing 93 is shown at 163 and substantially encloses the spur gear 157. Another housing portion 164 is formed integrally with the base plate 117 and forms a partial enclosure and bearing support for the slotted spur gear 160. Thus, as shown in Figure 6, the upper central portion of the slotted spur gear 160 is open and unobstructed to permit the wire strand 75 to lay on top thereof and further permits dropping into the slot 162 when the slot is rotated to its uppermost position.

The slotted spur gear 160 has an unusual construction, as shown in Figure 3. The gear includes spaced disc members 165 and 166 with the included spur gear 160 therebetween. The discs 165 and 166 are substantially of greater diameter than the spur gear proper and thus overlie the sides of the driving spur gear 157. This of course assists in maintaining the gear 160 in proper position in the wire twisting mechanism. The discs 165 and 166 are snugly engaged by the supporting arm 164 and thus the discs ride against the inner surface of the arm 164. A cross arm 167 is fastened between the nut 158 and the spur gear 157 and is employed for the purpose of insuring a movement of the wire strands into the innermost crotch portion of the slot 162 of the spur gear 160. The cross arm has oppositely extending finger members 168 and 169 arranged and constructed to engage the wire strand portions upon each revolution of the spur gear 157. It will be noted that the slot 162 in the spur gear 160 has a relatively wide mouth 170 in the disc portions 165 and 166 in order to facilitate easy entrance of the wire strand portions.

The spiral hooks 77 and 126 disposed on opposite ends of the cross shaft 122 perform the function of holding the wire strands looped during the inline intertwisting of the ends and following completion of the twist the spiral hooks are so rotated as to release the loops in the wire strands, thus permitting the bale encircling strands to be stripped from the twister mechanism for discharge of the bale from the end of the bale-forming chamber. The detail construction of the spiral hooks are best shown in Figures 8, 10 and 11. Disc-like hub members 171 and 172 respectively, for the spiral hooks 77 and 126, are mounted on the shaft 122 and held rigidly thereto by means of locking pins 173 and 174. Each of the hubs 171 and 172 has an outwardly projecting post, or the like, 175 and 176 which is offset from the axis of the shaft 122. These posts 175 and 176 constitute the supports for the spiral hooks 77 and 126 and form integral continuations thereof. The hook portions themselves, designated by the numerals 177 and 178, are substantially circular in shape and as shown in Figure 11 extend from the post member 175 almost around the complete circumference of the hub 171 leaving only a small opening 179 through which the strand hook may eventually be discharged.

In reviewing the operation of the spiral hooks 77 and 126, it is noted that they receive their drive from the shaft 33 which by means of the key 111 transmits rotational motion in the direction of the arrow 180 to the intermittent or mutilated bevel gear 109. The gear 109 causes intermittent drive of the bevel gear 118. This in turn causes rotation of the downwardly and forwardly inclined shaft 112 depending upon the position of the bevel gear teeth on the mutilated gear 109. The bevel gear 120 at the lower end of the shaft 112 is similarly rotated inasmuch as it is locked to the shaft 112. The bevel gear 120 engages with the bevel gear 125 which is fastened to the cross shaft 122 by means of a cross pin 181. Now, as the shaft 122 rotates it is evident that the spiral hooks 77 and 126 will similarly be rotated and will rotate at the time and in an amount equal to the gear spacing on the mutilated gear 109. Each hook is provided with a strand retaining member 182 and 183 which have flanges 184 and 185 respectively. The retaining members 182 and 183 are fastened by means of bolts 186 and 187 to the supporting plate 117. These strand retaining members are also provided with upstanding flanges or walls 188 and 189 respectively, which lie closely adjacent the spiral hooks 77 and 126 respectively. Each of the upright flanges 188 and 189 has a laterally and inwardly projecting finger-like member 190 and 191 which actually functions to hold the wire strands in position in the spiral hooks 77 and 126 until such time as it is desired to strip the wire loops from the hooks.

In the operation of the device of this invention, the continuously operating cycle starts in the position of the various elements as shown in full lines in Figures 3, 6, 7, and 13. In this position an end of a wire strand is held in the wire holder mechanism, broadly designated as number 74. As shown in Figure 9 the wire end 141 is gripped and passes out and back over the wire holder 74 and thence over the wire twister mechanism 76 and around the forwardly disposed spiral hook 77 at the point of the offset post 175. From here the wire strand designated as 78 projects rearwardly through the slot 162 in the slotted gear element 165—160—166. Leaving the slotted gear the wire strand continues rearwardly through the tunnel member 127 in the surface plate 117 so there will be no sharp bends of the wire strand as it passes around the hay being baled. The general path of the wire strand is shown in dash lines in Figure 2. The reciprocating plunger causes an extension of the wire strand from its source to form around the rear end of the bale. When sufficient hay or other material to be baled has been pushed into the bale-forming chamber 10 to cause enough rotation of the hay penetrating star wheel 48 to release the arm member 46 the clutch 36 will be actuated to cause rotation of the shaft 33. It is this shaft 33 which drives all of the wire twisting mechanisms of this invention. Further, rotation of the shaft 33 directly causes movement of the strand carrying needle 65 to thus complete the encircling of the formed bale with the wire strand.

A pair of spaced sheaves 192 and 193 are journally mounted in the top end of the strand carrying needle 65. The wire strand 73 from a source of wire supply comes through a wire guiding element 194 whereupon it passes between the spaced sheaves 192 and 193 which are journalled respectively at 195 and 196 in the end of the needle 65. In its upward movement the sheave 192 of the needle 65 pushes the strand of wire upwardly as a loop with the inner portion thereof constituting the forward end of the newly formed bale as shown in Figures 2 and 14. The strand portion 82 is laid against the forward end of the bale 79 and the upper extension of the portion 82, namely 197, is laid into the spiral hook 77 and over the top of the twister mechanism 76 adjacent the portion 75 of the other strand end and thence through the notch 135 in the strand holder which is spaced upwardly and arcuately around from the elongated notch 137 through which the strand end 75 extends. It should be understood that the mutilated gears of Figure 12 are arranged and constructed to drive the various bevel gears for the strand holding mechanism 74, the wire twisting mechanism 76 and the spiral hooks 77 and 126 depending upon the time and degree of drive desired. The successive operations of the formation of the wire twist are shown from Figures 13 through 18 in minute stages of completion. Figure 13, as previously stated, shows the condition of the twisting mechanism preparatory to formation of a new bale. Figure 14 shows the twisting mechanism with the encircling strand being laid in position thereon by the wire carrying needle 65. Figure 15 shows the device with the needle 65 still in its uppermost position and with the various elements commencing to rotate. First, the wire holding mechanism is rotated a small amount in the direction of the arrow 198 causing the strand end 197 to be varried down and around the wire holder against the finger retainer 143. Similarly the strand end 75 passing through the elongated notch 137 moves still farther underneath the wire holder. Concurrently the slotted gear element comprising the side discs 165 and 166 and the included slotted gear 160 is rotated in the direction of the arrow 199 whereupon the open slot 162 has moved from a directly down position in Figure 13 to an upwardly opening position in Figure 15. This of course facilitates the entrance of the adjacent strands 75 and 197 into this slotted gear element. The end 169 of the wire moving arm 167 positively pushes the strands 75 and 197 downwardly into the open slot 162 through its wide mouth 170. This causes the two wire strands to be located in line with the previously inserted strand 78 and in line with the center or axis of rotation of the slotted gear 160. In Figure 16 the wire carrying needle 65 is being retracted downwardly so that the wire strand is pulled by the sheave 193 of the needle 65. A new wire strand portion 200 which constituted the upper or outer portion of the loop carried by the needle is now being laid by the needle first into the succeeding elongated slot 138 in the wire holding mechanism 74 and over the wire twisting mechanism and similarly over the spiral hook 77 at the point of the projection 175 so that the portion 200 of the wire cannot become involved in the presently made wire twist. This is an important feature of the invention. Following the position of the mechanism in Figure 15 the wire twisting rotor 165—160—166 is causing the strands 78, 75 and 197 to be intertwisted together in what is called a three wire inline twist. In other words, the wire portions are lying axially of the rotating slotted gear so that they are twisted about themselves in an inline manner. Further, the strand portions 75 and 78 are hooked onto the spiral hook 77 creating a loop 201, as shown in Figure 16. It should be realized that the outer end 141 of the strand portion 75 is still being gripped, as shown in Figure 9, in the condition of the mechanism as in Figure 16. This means that during the formation of the inline twist by the slotted gear the end of the strand portion 75 is gripped by the wire gripping means 74.

Moving now to Figure 17 we find the wire twisting slotted gear has rotated still further causing a relatively tight inline wire twist as shown at 202 wherein the several twists have snugged up against the loop portion 201 of the wire around the hook end 177 of the spiral hook 77. Now, however, the spiral hook 77 is being rotated in the direction of the arrow 203 so that the portion 177 of the hook is being pulled out from within the loop 201 and at the same time maintaining or holding the newly laid portion 200 upwardly out of the way of the inline twist 202. Still further at this point, the wire holding mechanism has released the end 141 of the strand portion 75 and is in the process of cutting the wire strand 197 which is shown at 204 in Figure 18. Simultaneously the strand portion 200 is being gripped as the previous strand end 75 in Figure 9 adjacent the cutting of the connection between the portion 197 and 200 at 204. Also in Figure 18 the hook end 177 is shown completely removed from the loop 201 and the hook 77 opens to receive the strand portion 200. At this point also the slotted portion 162 of the gear member is now open to the bottom so that subsequent insertion of hay into the bale-forming chamber 10 for the purpose of making a new bale will be able to push the previously formed and tied bale out of the chamber with the wire twist as an integral portion thereof. It will be obvious that for purposes of convenience only one encirclement of the wire strand has been described in Figures 13 to 18 inclusive, although this simultaneously occurs at the other twisting mechanism driven by the mutilated ring gears 84 and their associated bevel gears 106 and 107 for the wire holding mechanism 99 and the twister 100. This then means that the completed bale is tied with two strands of wire having the three wire twist as shown in Figure 18. Attention is again drawn to the spiral hooks 77 and 126 which, as clearly shown in Figures 16, 17 and 18, perform the dual-function of holding the looped portion 201 of the intertwisting wires and provide for the holding of the newly laid wire up and out of the way of any of the intertwisting mechanism for the current twist. Also, the spiral hook has been shown to be removable from the loop 201 and at this time provides a crotch support for the newly laid wire 200 in the same manner as the wire was supported in Figure 13 preliminary to the formation of a hay bale. The wire retaining members 182 and 183, by their respective laterally inwardly projecting fingers 190 and 191, prevent unwarranted stripping of the wire loops 201 from the spiral hooks preliminary to the desired release time. All of this operation occurs without in any way halting plunger reciprocation or without holding the needle up through the bale chamber during the twisting of the encircling wire strands.

Numerous details of construction may be varied throughout a wide range without departing from the principles disclosed herein and I therefore do not propose limiting the patent granted hereon otherwise than as necessitated by the appended claims.

What is claimed is:

1. A wire twister for balers having a bale forming chamber, a source of wire supply, needle means on one side of said bale forming chamber adapted to carry a strand of wire across the bale forming chamber, means gripping said strand of wire on the side of the bale forming chamber opposite the needle means, spiral hook means spaced from said means gripping said strand and having the strand of wire hooked thereover, means for compressing material to be baled in said bale forming chamber against said strand crossing the chamber and causing the strand to be extended by pulling from the source of wire supply, means to actuate the needle means when a bale of desired length has been formed, said needle means carrying a looped strand across the bale forming chamber and laying the inner portion of said looped strand into said spiral hook means and said means gripping the wire strand, means intertwisting three portions of wire strand in an inline twist, means rotating said spiral hook means to strip said twist and to successively hold the outer of said looped portions of strand carried by the needle means out of the presently made twist and to then drop it into the spiral hook means to form part of the succeeding twist.

2. A wire twister for balers having a bale forming chamber adapted to receive uncompressed material adjacent one end and deliver compressed material at the other end, a source of wire supply, needle means on one side of said bale forming chamber adapted to carry a strand of wire across the bale forming chamber, spiral hook means mounted on the bale forming chamber opposite the needle means near the uncompressed material end of the bale forming chamber, gripping means for the strand of wire mounted on said bale forming chamber on the same side thereof as the spiral hook means and spaced therefrom toward the compressed material end of the bale forming chamber, twisting means positioned between the spiral hook means and the gripping means, said needle means arranged and constructed to place a strand of wire in said spiral hook and into said gripping means, means in said bale forming chamber for compressing material to be baled against the wire strand crossing the chamber and causing the strand to be extended by pulling from the source of wire supply, the wire strand on the side of the bale chamber having the spiral hook means extending from the spiral hook means and through the twisting means, means actuating the needle means when a bale of desired length has been formed whereby a looped strand of wire from the source of wire supply is carried up by the needle means around the end of the formed bale to thus completely encircle the formed bale, and the inner portion of the looped strand laid in the spiral hook means, in the twisting means, and in the gripping means, whereby the twisting means makes an inline wire twist of the three wire strands therein, and means rotating said spiral hook for closing it to entrance of the outer portion of the looped strand and to strip the completed twist therefrom.

3. A device as set forth in claim 2 in which continued rotation of the spiral hook opens the spiral hook to reception of the outer portion of the looped strand preparatory to making a succeeding bale, said spiral hook means including a hub, an outwardly projecting post on said hub, and a circularly shaped hook on the outer end of said projecting post.

4. A device as set forth in claim 3 in which there is included stationary finger means closely adjacent said spiral hook to maintain wire strands in said hook until release is desired.

5. A wire twister for balers having a bale forming chamber adapted to receive uncompressed material adjacent one end and deliver compressed material at the other end, a source of wire supply, needle means on one side of said blade forming chamber adapted to carry a strand of wire across the bale forming chamber, spiral hook means mounted on the bale forming chamber opposite the needle means near the uncompressed material end of the bale forming chamber, gripping means for the strand of wire mounted on said bale forming chamber on the same side thereof as the spiral hook means and spaced therefrom toward the compressed material end of the bale forming chamber, twisting means positioned between the spiral hook means and the gripping means, said needle means arranged and constructed to place a strand of wire in said spiral hook and into said gripping means, reciprocating plunger means in said bale forming chamber for compressing material to be baled against the wire strand crossing the chamber and causing the strand to be extended by pulling from the source of wire supply, the wire strand on the side of the bale chamber having the spiral hook means extending from the spiral hook means and through the twisting means, means moving the needle means when a bale of desired length has been formed whereby a looped strand of wire from the source of wire supply is carried up by the needle means around the end of the formed bale to thus completely encircle the formed bale, and the inner portion of the looped strand laid in the spiral hook means, in the twisting means, and in the gripping means, said means moving the needle means returning it to its starting position, whereby the twisting means makes an inline wire twist of the three wire strands therein, and means rotating said spiral hook, said spiral hook means being closed to entrance of the outer portion of the looped strand.

6. A wire twister for balers having a bale forming chamber adapted to receive uncompressed material adjacent one end and deliver compressed material at the other end, a source of wire supply, needle means on one side of said bale forming chamber adapted to carry a strand of wire across the bale forming chamber, spiral hook means mounted on the bale forming chamber opposite the needle means near the uncompressed material end of the bale forming chamber, gripping means for the strand of wire mounted on said bale forming chamber on the same side thereof as the spiral hook means and spaced therefrom toward the compressed material end of the bale forming chamber, slotted gear twisting means positioned between the spiral hook means and the gripping means, and means for pushing wire strands into said slotted gear means, said needle means arranged and constructed to place a strand of wire in said spiral hook and into said gripping means, means in said bale forming chamber for compressing material to be baled against the wire strand crossing the chamber and causing the strand to be extended by pulling from the source of wire supply, the wire strand on the side of the bale chamber having the spiral hook means extending from the spiral hook means and through the slotted gear twisting means, means actuating the needle means when a bale of desired length has been formed whereby a looped strand of wire from the source of wire supply is carried up by the needle means around the end of the formed bale to thus completely encircle the formed bale, and the inner portion of the looped strand laid in the spiral hook means, in the slotted gear twisting means, and in the gripping means, whereby the slotted gear twisting means makes an inline wire twist of the three wire strands therein, and said spiral hook turned to prevent entrance of the outer portion of the gripped strand during the twisting operation.

7. A device as set forth in claim 6 in which the means for pushing wire strands into the slotted gear twisting means comprises a rotating arm having oppositely disposed fingers lying adjacent said slotted gear twisting means and rotatable simultaneously with said slotted gear twisting means.

8. A device as set forth in claim 7 in which the slotted gear twisting means includes a centrally disposed radially slotted gear and having integral slotted discs of larger diameter on both sides of said slotted gear.

9. A device as set forth in claim 8 in which the side discs are similarly slotted and have wide mouths at their peripheries.

10. A wire twister for balers having a bale forming chamber comprising a source of wire supply, needle means, wire gripping means, spiral hook means, twisting means and wire severing means, one end of said wire held by said wire gripping means, said wire extending into said spiral hook means, across said bale forming chamber and thence to said source of wire supply, means for compressing material in said bale forming chamber against said wire crossing the chamber and causing the strand to be extended by pulling from the source of wire supply, means to actuate the needle means, said needle means carrying a looped strand of wire across the bale forming chamber and laying the inner portion thereof into said spiral hook means and said means gripping the inner wire strand, means intertwisting three portions of wire strand by said twisting means in an inline twist, means rotating said spiral hook means to strip said twist and to successively hold the outer of said looped portions of strand carried by the needle means out of the presently made twist and by further rotation to drop the outer wire strand into the spiral hook means to become part of the succeeding twist.

References Cited in the file of this patent

UNITED STATES PATENTS

| | | |
|---|---|---|
| 1,040,786 | Seehafer et al. | Oct. 8, 1912 |
| 1,257,465 | Dudley | Feb. 26, 1918 |
| 1,624,157 | Carroll | Apr. 12, 1927 |
| 2,548,559 | Ronning et al. | Apr. 10, 1951 |